United States Patent [19]
Smith

[11] 4,032,022
[45] June 28, 1977

[54] APPARATUS FOR HANDLING CARTONS AND THE LIKE

[76] Inventor: John S. Smith, 965 11th St., Boulder, Colo. 80302

[22] Filed: Nov. 3, 1975

[21] Appl. No.: 628,518

[52] U.S. Cl. .......................... 214/8.5 C; 214/1 BB; 214/1 BD
[51] Int. Cl.² ........................................ B65G 59/02
[58] Field of Search ............ 214/1 BB, 1 BT, 1 BC, 214/1 BDC, 1 B, 1 BS, 6 A, 8.5 R, 8.5 C, 8.5 D, 152

[56] References Cited

UNITED STATES PATENTS

| | | | |
|---|---|---|---|
| 3,179,262 | 4/1965 | Carlson, Sr. et al. | 214/1 BT X |
| 3,534,872 | 10/1970 | Roth et al. | 214/8.5 C |
| 3,669,283 | 6/1972 | Brown, Jr. | 214/8.5 C |
| 3,776,398 | 12/1973 | Stuart et al. | 214/8.5 C |
| 3,915,312 | 10/1975 | Clark | 214/1 BB |
| 3,917,081 | 11/1975 | Pearne et al. | 214/8.5 X |
| 3,917,082 | 11/1975 | Howard et al. | 214/8.5 D |

FOREIGN PATENTS OR APPLICATIONS

| | | | |
|---|---|---|---|
| 1,059,510 | 2/1967 | United Kingdom | 214/8.5 C |

*Primary Examiner*—Frank E. Werner
*Attorney, Agent, or Firm*—Gary M. Polumbus

[57] ABSTRACT

An apparatus for removing cartons from a stack of cartons arranged in horizontal layers with pairs of cartons in each layer arranged in perpendicular relationship with adjacent pairs includes first gripping means for lifting a layer of cartons from the stack and separating cartons in the layer into two groupings and second gripping means adapted to grip each grouping of cartons and further separate cartons in the grouping for deposition at a spaced location. The second gripping means consists of reciprocating heads at least one of which is adapted to pivot about a vertical axis so as to reorient selected cartons so that the cartons can be deposited at the spaced location in parallel relationship. Further, the second gripping means are pivotal about a horizontal axis so as to be swingable into an out of the way position to allow another of the second gripping means to move along a preselected path from the first gripping means to the spaced location. The method of the invention includes the steps grasping with the first gripping means a plurality of cartons or the like arranged in a common horizontal plane, lifting the grasped cartons, separating the lifted cartons while they are grasped, grasping the separated cartons with second gripping means, releasing the cartons from the first gripping means, and transferring the cartons with the second gripping means to a spaced location.

9 Claims, 5 Drawing Figures

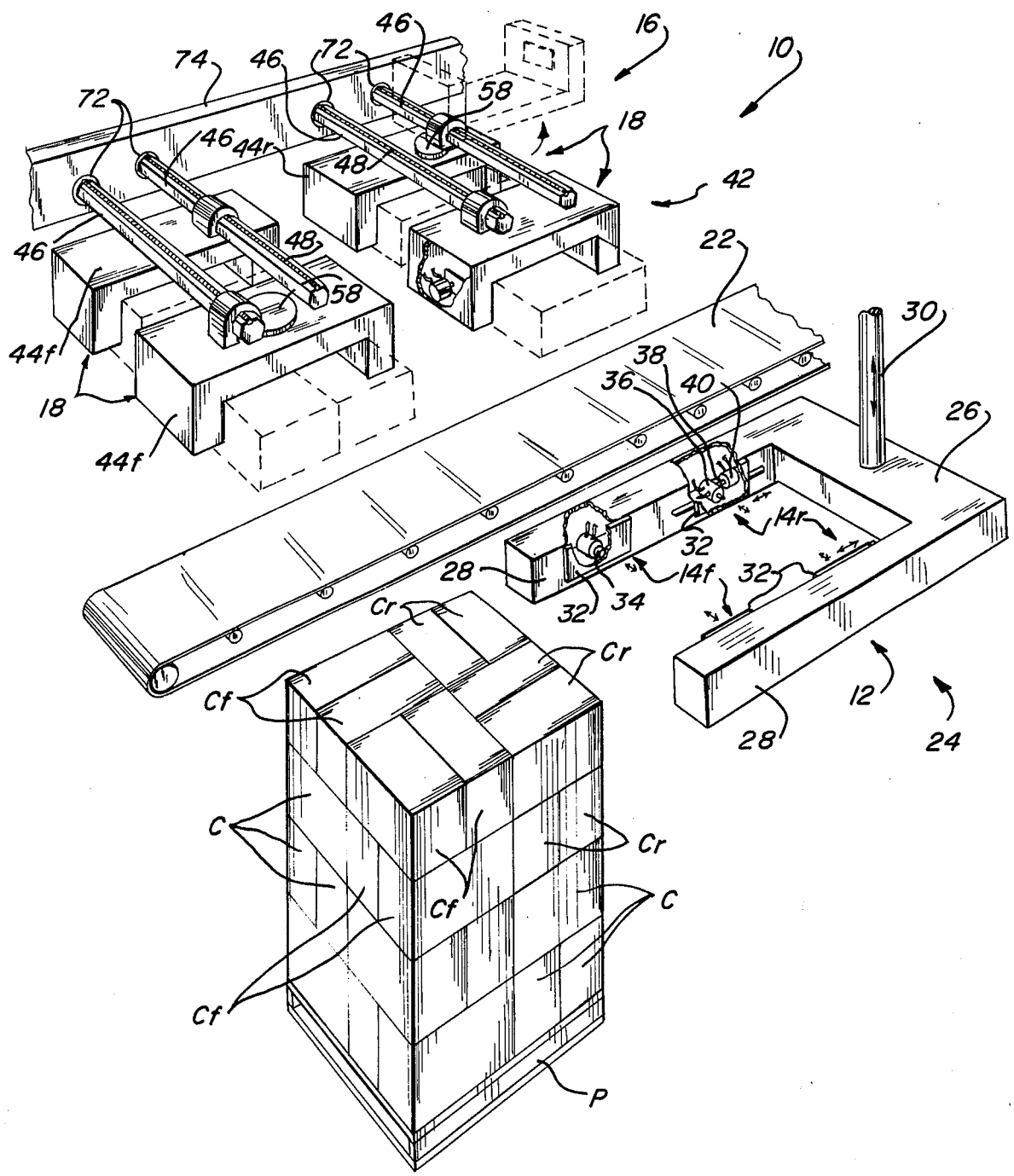
Fig_1

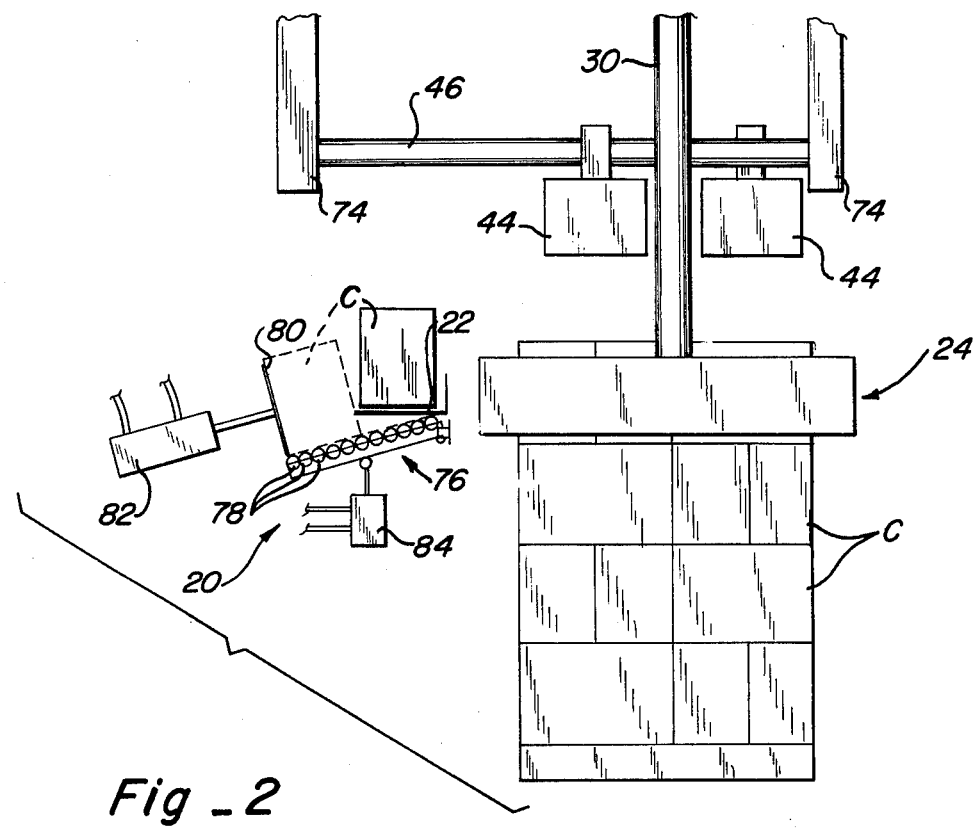
Fig _ 2
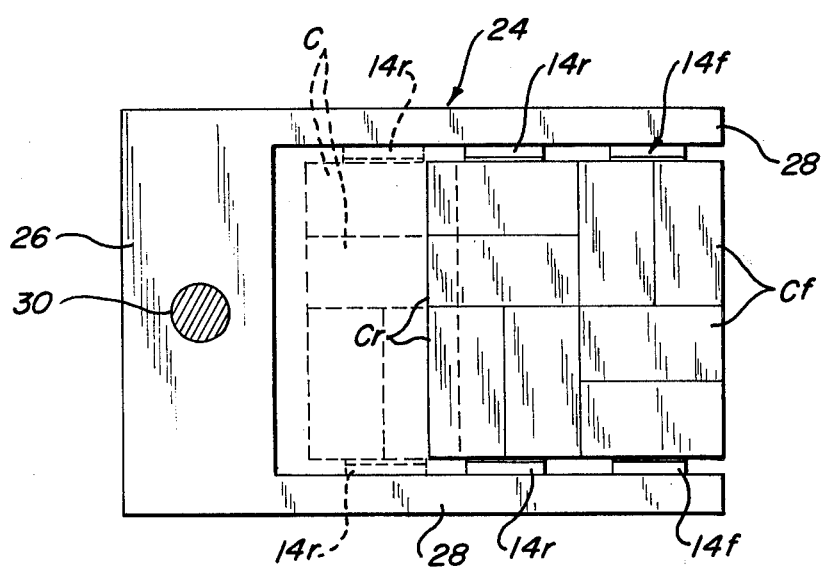
Fig _ 3

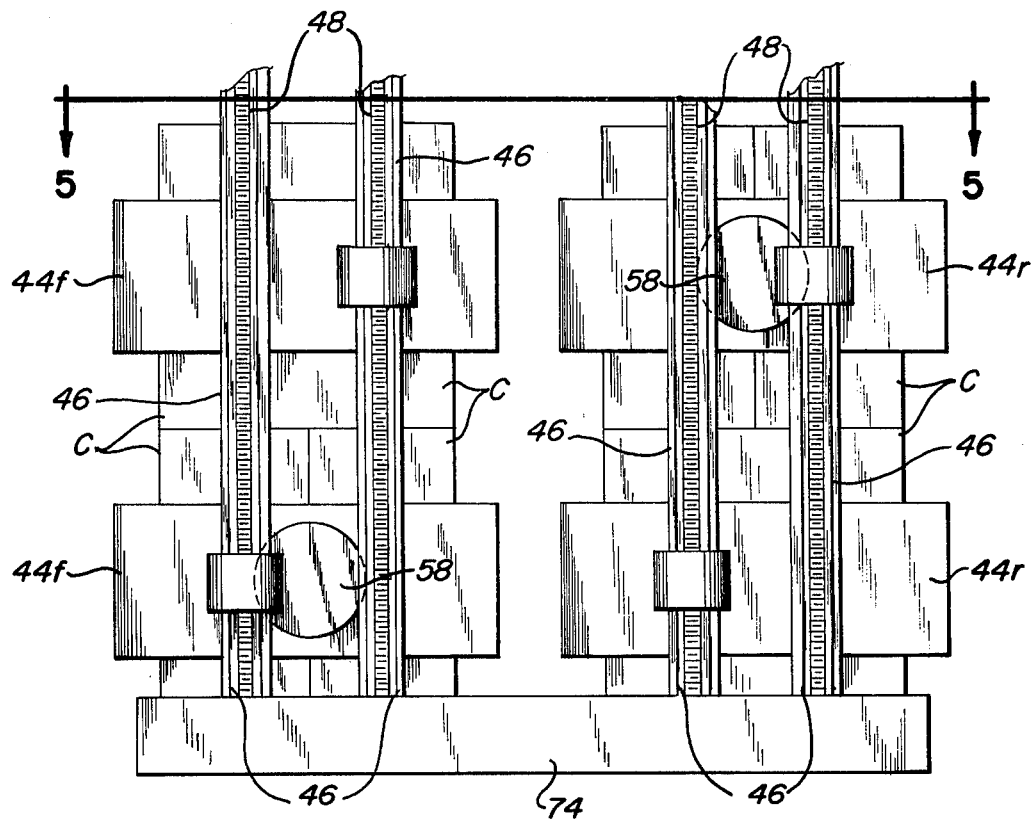
Fig_4
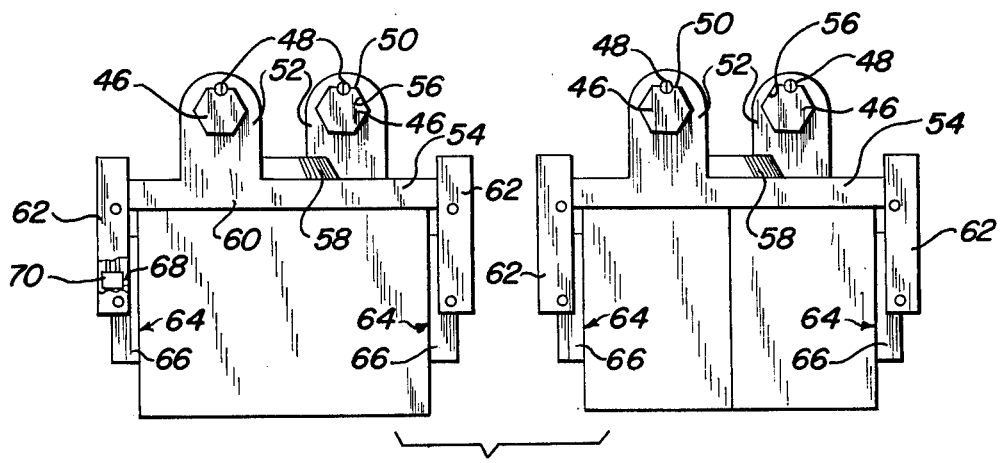
Fig_5

APPARATUS FOR HANDLING CARTONS AND THE LIKE

BACKGROUND OF THE INVENTION

The present invention relates generally to methods of handling material and to material handling apparatus but more particularly to a method and apparatus for handling cartons and the like for transporting the cartons from a composite stack to a spaced location and while transporting the cartons separating the cartons for deposition at the spaced location.

While numerous systems have been developed for unloading pallets and the like wherein cartons or other similar goods are stacked thereon, to applicant's knowledge, none has been totally satisfactory for removing and singulating the articles so that they can be deposited at a spaced location, such as on a conveyor belt for transportation to a distant location. One difficulty in unloading cartons from a pallet or the like is that the cartons are typically arranged on the pallet in superimposed layers with the cartons in each layer being oriented in perpendicular relationship. In most instances, the cartons in one layer are grouped in pairs so that each pair lies perpendicularly to an adjacent pair. Obviously, to transfer the cartons from the pallet to a spaced location and in a manner such that the cartons are singulated and arranged in parallel relationship, means must be provided for spacially reorienting the cartons and for separating the cartons from each other.

OBJECTS OF THE INVENTION

It is a primary object of the present invention to provide a new and improved method and apparatus for handling cartons and the like.

It is another object of the present invention to provide a new and improved method and apparatus for transporting cartons or other similar articles from a composite arrangement of the cartons to a spaced location and simultaneously reorienting the cartons so that they can be deposited in a singular fashion in parallel relationship.

It is another object of the present invention to provide an apparatus for separating contiguous cartons or other similar articles in layers from underlying layers of such cartons and separating the articles and reorienting the article so that they can be deposited at a spaced location in singulated parallel relationship.

SUMMARY OF THE INVENTION

The method of the present invention for removing cartons from a layered stack of the cartons and transferring them to a spaced location includes the steps of grasping with first gripping means a plurality of the cartons which are arranged in a common horizontal plane, lifting the gripped cartons, separating the lifted cartons while they are gripped by the first gripping means, gripping the separated cartons with second gripping means, releasing the cartons from the first gripping means, and transferring the cartons with the second gripping means to a spaced location. Further steps in the method include further separating the cartons with the second gripping means which include gripping members, rotating the cartons held by the gripping members to assure that cartons arriving at the spaced location are oriented in parallel relationship to other cartons arriving at the spaced location and moving selectd ones of the gripping members out of the path of movement of the other gripping members to allow freedom of movement between the first gripping means and the spaced location.

The apparatus for carrying out the above method includes first gripping means adapted to releasably grasp a plurality of of cartons arranged in a horizontal plane with said first gripping means including first separating means for separating at least some of the gripped cartons from others while maintaining a grip on all of the cartons, and second gripping means for gripping the separated cartons held by the first gripping means and removing the cartons from the first gripping means. The second gripping means are movable relative to the first gripping means and include second separating means adapted to further separate cartons gripped thereby and deposit the cartons at a preselected location. The second gripping means are adapted to rotate the cartons held thereby so that each carton deposited at the preselected location can be aligned in parallel relationship with previously and subsequently deposited cartons. The second gripping means also includes means for moving each of the second separating means out of a common path of movement so that the separating means are free to move along the path in transferring cartons from a first location to the preselected location.

Other objects, advantages and capabilities of the present invention will become more apparent as the description proceeds taken in conjunction with the accompanying drawings.

BRIEF DESCRIPTION OF THE DRAWINGS

FIG. 1 is a diagrammatic perspective view of the apparatus of the present invention situated adjacent to a stack of cartons on a pallet.

FIG. 2 is a diagrammatic elevational view showing the apparatus of FIG. 1 in operational relationship with a stack of cartons on a pallet.

FIG. 3 is a diagrammatic plan view of the first gripping means of the apparatus of FIG. 1 in operative relationship with a stock of cartons on a pallet.

FIG. 4 is a diagrammatic top plan view of the second gripping members in operational engagement with cartons being gripped thereby.

FIG. 5 is a vertical section taken along line 5—5 of FIG. 4.

DESCRIPTION OF THE PREFERRED EMBODIMENT

Referring first to FIG. 1, the apparatus 10 of the present invention can be seen to include first gripping means 12 adapted to remove cartons C from a pallet P, first separating means 14 on the first gripping means 12 for separating the cartons gripped by the first gripping means and second gripping means 16 including second separating means 18 for separating cartons gripped by the second gripping means 16. The first and second gripping means are adapted to cooperate with a carton feed mechanism 20, FIG. 2, disposed adjacent to a removal conveyor belt 22, to transport cartons from the pallet to the removal conveyor belt in such a manner that they will be deposited on the conveyor belt in single file parallel relationship.

To facilitate an understanding of the capabilities of the present invention, it will be described in connection with the unloading of cartons C from a pallet P wherein the cartons are arranged on the pallet in vertically aligned layers with each layer containing eight such cartons in four separate pairs with the cartons in each pair being juxtapositionally arranged in parallel relationship and being perpendicularly oriented relative to adjacent pairs. This arrangement of the cartons is best illustrated in FIG. 1 and is a common form of arranging cartons on a pallet.

Referring to the first gripping means 12 and first separating means 14, which may be referred to jointly as the lift and separator 24, it can be seen that it is of generally U-shaped configuration having a base portion 26 and two spaced parallel legs 28 extending perpendicularly away from the base portion at opposite ends thereof. The base portion 26 is anchored to the lower end of a lift rod 30 which is operably connected to a lift mechanism (not shown) so that the lift and separator 24 can be raised and lowered as desired. Further, the lift mechanism, which is not shown, is preferably universally movable in a horizontal plane so that the opening between adjacent legs 28 of the lift and separator can be aligned with a layer of cartons stacked on the pallet P or the like.

The first separating means 14 are disposed in each leg of the lift and separator and will hereafter be referred to as gripper members. There are a pair of gripper members 14 in each leg and they are spaced longitudinally of the associated leg to cooperate with an opposing gripper member 14 in the opposite leg to frictionally grip two pair of cartons C so that a complete layer of cartons can be gripped by the lift and separator and thereby be removed from the remaining cartons on the pallet when desired. There are a forward pair of gripper members 14f and a rearward pair of gripper members 14r with the forward pair being identical and including a pressure pad 32 of generally rectangular configuration mounted on the end of a reciprocating rod 34 of a conventional power cylinder 36 so that the pad can be selectively moved toward and away from the pad of the opposing gripper member 14f to squeeze or frictionally grip cartons positioned therebetween or release same as desired.

The rearward pair of gripper members 14r likewise include a pressure pad 32 of generally rectangular configuration mounted on a reciprocating rod 34 of a conventional power cylinder 36 but in the case of the rearward gripper members, the power cylinder 36 is mounted on a reciprocating rod 38 of a perpendicularly related power cylinder 40 so that the pressure pad 32 is not only reciprocally movable toward and away from the opposite associated gripper member but is also reciprocally movable longitudinally of the leg 28 in which it is mounted. As can be seen, the power cylinders are all mounted within the interior of the U-shaped lift and separator and the fluid lines to and from the cylinders pass in any conventional manner through the lift and separator to a conventional pump and reservoir (not shown).

It will, therefore, be appreciated that the U-shaped lift and separator 24 can be advanced by the lift mechanism (not shown) into straddling relationship with the uppermost layer of cartons C on the pallet P such that a pair of forwardmost pairs of cartons Cf in the layer are aligned between the forward gripper members 14f and a pair of rearwardmost pairs of cartons are aligned between the rearward gripper members 14r. Actuation of the power cyliners 36, upon which the pressure pads 32 of the gripper members 14 are mounted, will extend the pressure pads inwardly into frictional gripping relationship with the cartons C positioned therebetween enabling the lift and separator 24 to positively grip the cartons so that they can be lifted and removed from the cartons stacked therebeneath. After the cartons in the uppermost layer have been separated from those remaining in the stack, the rearward gripper members are moved longitudinally in the legs of the base so as to be further separated from the forward gripper members thereby separating the rearwardmost pairs of cartons Cr from the forwardmost pairs Cf. This can be best seen in FIG. 3 wherein the rearwardmost pairs of cartons are shown separated from the forwardmost pairs of cartons by a dotted line representation of the rearwardmost cartons. This operation may be referred to as the second separation of the cartons, with the first separation occurring when the cartons in the uppermost layer of the stack are separated from the remaining cartons in the stack either by horizontal, vertical or a combination of horizontal and vertical movements of the lift and separator relative to the stack of cartons on the pallet.

The second gripping means 16 and second separating means 18, which may also be referred to jointly as the cross-feed mechanism 42, are oriented above the lift and separator 24 and include gripping heads 44 which are adapted to reciprocate along parallel paths of movement to transfer cartons along an elevated path from the lift and separator to the conveyor belt 22 or other means adapted to transport the cartons to a final destination.

As will be appreciated by reference to FIGS. 1, 4 and 5, there are two pair of gripping heads 44 with each pair of gripping heads adapted to reciprocate along a common path of movement with one set of gripping heads 44f hereinafter referred to as the forward set of gripping heads, being adapted to transport cartons retained or gripped by the forward gripping members 14f of the lift and separator and the other gripping heads 44r, hereinafter being referred to as the rearward gripping heads being adapted to transport cartons gripped by the rearward gripping members 14r of the lift and separator.

The forward and rearward pair of gripping heads are identical and will, therefore, be described by reference only to the rearward gripping heads 44r. As best seen FIGS. 1 and 4, each of the gripping heads are mounted on a traverse rod 46 which is of non-circular transverse configuration, in the disclosed form of hexagonal configuration, with each traverse rod including a screw member 48 extending along its length so as to be disposed primarily within the confines of the traverse rod but protruding longitudinally partially through an upper surface thereof. The screw member 48 is rotatable about its longitudinal axis independently of the traverse rod in which it is mounted and is adapted to cooperate with a partial internally threaded surface 50 of a semi-cylindrical sleeve 52 anchored to the top of the body 54 of the gripping head. The sleeve 52 has a hexagonal passage 56 therethrough adapted to mate with and slidably receive the associated traverse rod so that the gripping head is rotable in unison with the traverse rod about its longitudinal axis. As will be appreciated, as the screw member is rotated about its longitudinal axis, the associated gripping head is caused to advance or slide along the associated traverse rod causing the gripping head to be moved along a straight line path which extends in overlying relationship between the lift and separator and the conveyor belt. One of the gripping heads, hereafter referred to as a swivel gripping head, in addition to being rotatable about the longitudinal axis of the associated traverse rod includes a swivel member 58 in the upper surface thereof which interconnects the semi-cylindrical sleeve 52 and the body 54 of the gripping head so that the gripping head is pivotal about a vertical axis extending through the swivel. Accordingly, this gripping head is rotatable both about horizontal and vertical axes for a purpose to be set forth hereinafter.

Each gripping head 44 is of inverted U-shaped configuration with the base 60 of the U forming the top of the gripping head and the two depending legs 62 adapted to straddle a pair of cartons C to be gripped by the gripping head. Each leg 62 of the gripping head has a gripper member 64 disposed therein which includes a pressure pad 66 that is mounted upon the reciprocating rod 68 of a power cylinder 70. The power cylinder 70 is mounted within the leg and is adapted to extend the pressure pad toward the opposite pressure pad disposed in the opposing leg of the gripping head so that the cartons can be frictionally gripped and positively retained by the gripping head.

As will be appreciated, since the gripping heads are pivotal about horizontal axes, they are movable into a raised position, as can be appreciated by reference to the dotted line representation in FIG. 1, so that one gripping head can be moved out of the common path of movement of both gripping heads allowing the other gripping head to move freely along that path. In this manner, the gripping heads can be arranged relative to each other so that the gripping head which includes the swivel 58 for pivotal movement about a vertical axis can always be positioned to grip a pair of cartons held by the lift and separator which are oriented perpendicularly to the line of movement of the conveyor belt as will be more clearly explained later. Of course, due to the arrangement of the cartons on the pallet, the non-swivel gripping head can be positioned to grip the cartons retained by the lift and separator which are oriented parallel with the line of movement of the conveyor.

The traverse rods 46 supported at opposite ends in bearings 72 retained in a pair of spaced support bars 74 and are connected to power means (not shown) adapted to selectively effect pivotal movement of the traverse rods about their longitudinal axes. Similarly, each swivel 58 has an independent power source (not shown) adapted to effect pivotal movement of the associated gripping head about a vertical axis extending through the swivel. Since these means are conventional, they have not been illustrated.

The cross-feed mechanism 42 has as an objective to remove from the lift and separator 24, the cartons gripped thereby and to separate the cartons into parallel pairs of cartons with each pair oriented so as to lie in parallel relationship with the line of movement of the conveyor belt 22. Again, referring to the rearward gripping heads 44r, as best illustrated in FIGS. 1 and 4, the heads are aligned with the underlying cartons C so that the swivel gripping head overlies a pair of cartons which are arranged perpendicularly to the line of movement of the conveyor belt and the non-swivel gripping head overlies a pair of cartons arranged in parallel relationship with the conveyor belt so that the lift and separator 24 can be raised causing the cartons to be inserted into the channel between the legs 62 of each gripping head. Once the cartons have been so positioned, the power cylinders 70 in the gripping heads are activated to advance the pressure pads 66 into frictional engagement with the cartons aligned therewith so as to obtain a positive grip on the cartons. The pressure pads 32 on the lift and separator are then retracted to release the cartons and the lift and separator lowered to proceed to remove another layer of cartons from the pallet.

With the gripping heads 44 each retaining a pair of cartons, they are advanced along the associated traverse rods 46 by the screw member 48 until the cartons overlie the removal conveyor 22. As will be appreciated, with reference to FIGS. 1 and 4, with respect to the rearward gripping heads 44r, the cartons first being positioned over the conveyor are oriented perpendicularly to the line of movement of the conveyor belt. In order to orient the cartons so that they are parallel to the conveyor belt, the swivel 58 is activated to rotate the associated gripping head about a vertical axis through a 90° angle. The cartons are then dropped from this gripping head by retracting the pressure pads 66 and allowing the cartons to drop downwardly to the conveyor belt. The swivel gripping head is then rotated about a horizontal axis by rotative movement of its associated traverse rod about its longitudinal axis so that the swivel gripped head is elevated and moved out of the common path of movement of the gripping heads. This movement is illustrated in FIG. 1 showing the swivel gripping head in a phantom line position after it has been reversly rotated by the swivel through 90° about a vertical axis. With the swivel gripping head out of the way, the non-swivel gripping head can then be advanced into overlying relationship with the conveyor belt and since the cartons retained thereby are oriented in a parallel relationship with the line of movement of the conveyor belt, it can drop the cartons to the conveyor belt after the previously deposited cartons have been advanced along the belt.

Since the rearwardmost cartons Cr in the next layer on the pallet are reversed in orientation relative to the cartons in the top layer which were previously removed, the relative positions of the rearward swivel and non-swivel gripping heads should be reversed for the next cycle of operation. The swivel gripping head is, therefore, advanced along its traverse rod and subsequently pivoted downwardly into the lower common path of movement so as to lie to the right of the non-swivel gripping head as viewed in FIG. 1. With this relative positioning of the swivel and non-swivel gripping heads when they are moved into alignment with the next layer of cartons held by the lift and separator, the swivel gripping head will again be aligned with a pair of cartons which are oriented in a perpendicular relationship relative to the line of movement of the conveyor belt and the non-swivel gripping head will be aligned with a pair of cartons which are parallel with the line of movement of the conveyor belt.

This sequence of operation is repeated until each layer of cartons on the pallet has been removed therefrom by the lift and separator, separated by the lift and separator into two groups of two pairs of cartons, and then futher separated by the gripping heads into four pairs of cartons with the cartons spatially oriented so as to lie parallel with the conveyor belt while being transferred into overlying relationships with the conveyor belt wherefrom they are dropped and thereby deposited on the conveyor belt.

As will be appreciated, as the cartons are dropped to the conveyor belt, they are dropped in pairs which are oriented in parallel relationship with the line of movement of the conveyor belt. If it is desired that the cartons be transferred along the conveyor belt in a single line as opposed to pairs, the box-mover mechanism 20 is utilized to receive and retain one of a pair of cartons dropped while the other carton is being advanced along the conveyor belt. After the first carton is removed from this location, the second carton may be moved into position on the conveyor belt for movement behind the first carton.

The box-mover mechanism is illustrated diagramatically in FIG. 2 to include a roller platform 76 pivotally mounted beneath the conveyor belt 22 so that the rollers 78 on the platform have their longitudinal axes extending parallel to the direction of movement of the conveyor belt and a pusher plate 80 disposed perpendicularly to the plane in which the rollers 78 are disposed which is connected to a power cylinder 82 for reciprocating movement across the surface of the rollers. In operation, one carton dropped from a gripping head will land on the conveyor belt and will be immediately removed from that location by the moving conveyor belt while the other carton is dropped onto the roller platform 76 which is normally inclined relative to horizontal so that a carton deposited thereon will roll over against the pusher plate 80 and away from the conveyor belt. After the first carton has been removed from the location by the conveyor belt, the roller platform is elevated into a horizontal position by a power cylinder 84 so that the top surface of the rollers are coplanar with the conveyor belt. The power cylinder 82 behind the pusher plate 80 is then activated to advance the pusher plate across the roller so that the carton positioned thereon will be advanced onto the conveyor belt so that it too is removed from the immediate location by the conveyor belt.

It will be appreciated from the above description that a method and apparatus has been defined which is adapted to efficiently unload cartons from a pallet or the like and separate the cartons into individual units for eventual removal in a singulated fashion along a removal conveyor belt or the like. Due to the unique manner in which cartons are typically stacked and arranged on a pallet or the like, the mechanism has been designed to not only separate but spatially reorient the cartons so that when they are deposited on the removal conveyor belt they are arranged in parallel relationship with the line of movement of the conveyor belt. Of course, the cartons could all be arranged so as to lie perpendicularly to the conveyor belt if desired or deposited on the conveyor belt in any selected or random orientation.

Although the present invention has been described with a certain degree of particularity, it is understood that the present disclosure has been made by way of example and that changes in details of structure may be made without departing from the spirit thereof.

I claim:

1. Apparatus for handling cartons and the like comprising in combination:
   first releasable gripping means adapted to releasably grasp a plurality of cartons, said first gripping means including first separating means for separating at least some of the cartons gripped by the first gripping means from other cartons gripped by the first gripping means,
   second releasable gripping means for grasping the separated cartons held by the first gripping means and removing the cartons grasped by the second gripping means from the first gripping means when the cartons are released by the first gripping means, said second gripping means being movable relative to said first gripping means and including second separating means adapted to further separate cartons grasped by said second gripping means and deposit the further separated cartons at a preselected location.

2. The apparatus of claim 1 wherein said second separating means consists of a plurality of gripper members, each gripper member being adapted to hold at least one of said cartons.

3. The apparatus of claim 2 wherein said gripper members are movable relative to each other.

4. The apparatus of claim 3 wherein at least some of the gripper members are pivotal about a generally vertical axis so as to be capable of reorienting a carton grasped thereby.

5. The apparatus of claim 4 wherein there are at least two gripper members, said gripper members being mounted for lineal movement along a common path and further including means for pivoting at least one of the gripper members about a generally horizontal axis to move it at least partially out of said common path to allow freedom of movement of the other gripper member along that path.

6. The apparatus of claim 5 wherein said members are mounted on separate parallel shaft, and further including power means for moving each gripper member axially along the shaft on which the gripper member is mounted, each of said shafts being rotatable about the longitudinal axis thereof to rotate the associated gripper member thereabout.

7. The apparatus of claim 4 wherein said gripper members are adapted to grasp cartons oriented in any one of several mutually perpendicular orientations.

8. The apparatus of claim 1 wherein said first separating means includes at least two sets of gripping elements and means for moving one set of gripping elements relative to another set of gripping elements.

9. The apparatus of claim 1 wherein said first gripping means is vertically movable so as to lift said cartons after the cartons have been grasped by the first gripping means and move the cartons into operative engagement with the second gripping means after the cartons have been separated by the first separating means, and wherein said second gripping means are horizontally movable to transfer cartons grasped thereby to a location spaced from the location where the cartons were grasped by said first gripping means.

* * * * *